United States Patent
Lawrence et al.

[15] 3,687,981

[45] Aug. 29, 1972

[54] PROCESS FOR MAKING A DIOXANE

[72] Inventors: Frederick R. Lawrence, Woodbury Heights; Robert H. Sullivan, Woodbury, both of N.J.

[73] Assignee: E. I. du Pont de Nemours and Company, Wilmington, Del.

[22] Filed: Jan. 17, 1968

[21] Appl. No.: 698,392

[52] U.S. Cl..............260/340.7, 260/602, 260/635 A, 260/635 E
[51] Int. Cl.........................C07d 15/04, C07c 31/20
[58] Field of Search ....260/635 E, 635 A, 340, 340.7

[56] References Cited

UNITED STATES PATENTS

| | | |
|---|---|---|
| 2,368,186 | 1/1945 | Wickert et al..........260/635 E |
| 2,734,889 | 2/1956 | Starr...........................250/340 |
| 2,888,492 | 5/1959 | Fischer et al............260/635 E |
| 3,054,813 | 9/1962 | Niederhauser.............260/602 |
| 3,168,579 | 2/1965 | Boswell et al...........260/635 A |
| 3,260,759 | 7/1966 | Skinner...................260/635 A |
| 3,456,017 | 7/1969 | Smith et al. .............260/635 E |
| 3,463,819 | 8/1969 | Smith et al.................260/602 |

*Primary Examiner*—Leon Zitver
*Assistant Examiner*—Joseph E. Evans
*Attorney*—James J. Flynn

[57] ABSTRACT

Trimethylene glycol produced by hydroformylating ethylene oxide with carbon monoxide and hydrogen under pressure between about 1,000 to 15,000 psig, preferably 3,000 to 6,000, in the presence of a metallic carbonyl catalyst and at least one solvent selected from the group consisting of aliphatic ethers having four to 16 carbon atoms, e.g., isopropyl ether, and halogen-containing aromatic and aromatic hydrocarbons each having six to 24 carbon atoms, e.g., bromobenzene or toluene, wherein the ratio by volume of ethylene oxide to solvent is within a range of from about 1:8 to 1:1 at a temperature of from about 100° to 130° C, preferably 110° to 120° C, to produce hydroxyethyl hydroxy dioxane and hydrogenating said dioxane to trimethylene glycol. Hydroformylating promoters, e.g., tertiary alcohols, can be used in the reaction in order to substantially increase the conversion of ethylene oxide to trimethylene glycol. Hydrogenation is conducted with any suitable hydrogenation catalyst, e.g., Raney nickel, and best results are obtained when the pH of the aqueous hydrogenation solution is slightly acidic, e.g., a pH of 2 to 6.9 and when hydrogenation is conducted first at 90° to 120° C for a predetermined period and then at 150° to 170° C until hydrogenation is substantially complete.

20 Claims, No Drawings

PROCESS FOR MAKING A DIOXANE

BACKGROUND OF THE INVENTION

Trimethylene glycol has a number of various uses. It has been used in coating compositions, synthetic lubricants and plasticizers. Recently, trimethylene glycol has been found to be especially useful as an intermediate in the production of polyester fibers and films as disclosed for example in U.S. Pat. No. 2,465,319. Trimethylene glycol is useful as one of the components of a bicomponent polyester fiber based on terephthalic acid and trimethylene glycol as disclosed, for example, in Fr. Pat. No. 1,442,768. However, trimethylene glycol used in making polyester fiber must be substantially free of impurities or undesirable discoloration of the polyester fiber results. Therefore, expensive purification procedures are often required to produce so-called polymer grade trimethylene glycol. Although there are several procedures for making trimethylene glycol, all these procedures have significant drawbacks. For example, one method for making trimethylene glycol on a commercial scale is the hydration of acrolein, by substances that produce hydrogen ions in aqueous medium, such as sulfuric acid, thereby forming hydracrylaldehyde, which is subsequently hydrogenated to the glycol. In these procedures, product yield is generally low because in the acid catalyzed hydration of acrolein to hydracrylaldehyde, side reactions also occur, which result in the formation of undesired by products. Also the acid catalysts used in such processes are partially consumed during the reaction, thus resulting in contamination of the resulting trimethylene glycol produced from the aldehyde. Furthermore, since sulfuric acid is very corrosive its use necessitates that the vessels be lined with materials not affected by the acid. More importantly, these procedures are expensive because yields of trimethylene glycol are relatively low whereas impurities are high, even under the rather drastic conditions of temperature and pressure used. Therefore, there is a need for an economically feasible process for making substantially pure trimethylene glycol in high yields.

SUMMARY OF THE INVENTION

This invention is directed to a process for making trimethylene glycol. The procedure involves two main steps: (1) hydroformylation of ethylene oxide under certain conditions and, (2) hydrogenating the resulting product to trimethylene glycol. More particularly, the process comprises hydroformylating ethylene oxide with carbon monoxide and hydrogen under pressures between about 1,000 to 15,000 psig, and preferably 3,000 to 6,000 psig, in the presence of a metallic carbonyl catalyst and at least one solvent selected from the group consisting of aliphatic ethers having four to 16 carbon atoms, halogen-containing aromatic and aromatic hydrocarbons having six to 24 carbon atoms wherein the ratio by volume of ethylene oxide to solvent is within a range of from about 1:8 to 1:1, and preferably 1:2 to 1:3, at temperature of from about 100° to 130° C, preferably 110° to 120° C, to produce hydroxyethyl hydroxy dioxane and then catalytically hydrogenating said dioxane to trimethylene glycol. In addition to the dioxane small quantities, e.g., less than about ten per cent, of hydroxypropionaldehyde are also formed during the reaction that are hydrogenated. Hydroformylating promoters can be employed in the process and when used the conversion values of ethylene oxide to trimethylene glycol are substantially increased. Representative hydroformylating promoters are tertiary alcohols, usually containing not more than 12 carbon atoms, e.g., tert-butyl alcohol and halogen containing inorganic compounds, e.g., inorganic salts and acids especially chlorine-substituted compounds such as hydrochloric acid. The products of the hydroformylation reaction on cooling separate as an oily phase from the solvent and unreacted ingredients. Hydrogenation of said dioxane, with or without hydroxypropionaldehyde, to trimethylene glycol is conducted in a slightly acidic medium, that is one having a pH of about 2 to 6.9. Quite surprisingly, the conversion is essentially quantitative and definite product purity improvement is obtained when the hydrogenating procedure is carried out in a stepwise manner by first heating the hydroxyethyl hydroxy dioxane at about 90° to 120° C for about one to two hours and then further hydrogenating at about 150° to 170° C until hydrogenation is substantially complete, e.g., usually in about one-half to one hour and a half. The present process provides an economically feasible means for making substantially pure trimethylene glycol since high yields result and recovery and recirculation of unreacted ingredients is possible.

DESCRIPTION OF PREFERRED EMBODIMENTS

The hydroformylation reaction of ethylene oxide with carbon monoxide and hydrogen in the presence of a metallic carbonyl catalyst and certain solvents is conducted at temperatures between about 100° to 130° C under superatmospheric pressures of from about 1,000 to 15,000 psig, and preferably 3,000 to 6,000, with best results obtained when pressure during hydroformylation is about 4,000 psig. The temperature at which the hydroformylation reaction is conducted is important and is maintained during the reaction between about 100° and 130° C and usually 110° to 120° C. The reaction conditions of both temperature and pressure are necessary steps in the process in order to produce hydroxyethyl hydroxy dioxane. If the temperature is much above about 130° C hydroxyethyl hydroxy dioxane is not produced, or, if produced in minor amounts, it will decompose and the resulting product cannot be hydrogenated to trimethylene glycol.

Hydroformylation solvents that are used in the process of the invention are aliphatic ethers having from about four to 16 carbon atoms and aromatic hydrocarbons, i.e., compounds containing only carbon and hydrogen, and halogen-containing aromatic hydrocarbons each having from about six to 24 carbon atoms. These aliphatic ethers, aromatic or halogen-containing aromatic hydrocarbons are liquid at 35° C or below, e.g., about −35° C and are effective solvents for ethylene oxide and for the resulting hydroxyethyl hydroxy dioxane (dimer). However, when the hydroformylation reaction mixture is cooled to about 35° C, e.g., about room temperature, or below, the solvent remains liquid and said solvent and unreacted ingredients separate from said dioxane. Since the hydroformylation solvents are not miscible with the resulting dioxane at these temperature conditions, two phases exist, namely, the solvent phase containing the unreacted ethylene oxide and catalyst and the dimer phase containing hydroxyethyl hydroxy dioxane and a small amount of hydroxypropionaldehyde. One phase being heavier than the other, usually the dimer phase is heavier than the solvent phase, they are easily separable by conventional methods such as decantation or siphoning. In addition, the aliphatic ethers and aromatic hydrocarbon solvents are inert in the hydroformylation system and they are usually polar enough to keep all reactants in a substantially homogeneous solution under hydroformylation reaction conditions. When halogen-containing aromatic compounds having a halogen on the ring carbon are used as solvents they increase the conversion of ethylene oxide to the glycol, thus exhibiting a promoter effect. Under most conditions it is preferable, for ease of separation, to employ as solvents halogen-containing aromatic hydrocarbons, aromatic hydrocarbons or aliphatic ethers that have a density of less than about 1.2, thus facilitating separation of the dimer phase from the solvent phase. Particularly preferred solvents used in the process are aliphatic ethers which usually contain from four to 8 carbon atoms, halogen-containing aromatic and aromatic hydrocarbons containing up to 12 carbon atoms. Representative aliphatic ethers that can be used in the process are diethyl ether, di-n-propyl ether, diisopropyl ether, ethyl-n-butyl ether, di-n-butyl ether, di-n-amyl ether, diisoamyl ether and di-n-hexyl ether. Representative aromatic hydrocarbons that are employed as solvents are benzene, and alkyl-substituted aromatic hydrocarbons such as toluene, xylene, hemimellitene, prehnitene, ethylbenzene, n-propylbenzene, cumene, n-butylbenzene, t-butyl-benzene, p-cymene, 1,3,5-triethylbenzene, dodecylbenzene; alkyl naphthalenes such as methyl naphthalene, ethyl naphthalene, dimethyl naphthalene, propyl-naphthalene and octyl-naphthalene and tetrahydronaphthalenes or halogenated derivatives thereof. Representative halogenated aromatic compounds that are liquid under operating conditions are alpha-naphthyl chloride, alpha-naphthyl bromide, naphthyl fluoride and especially single ring compounds such as chlorobenzene, bromobenzene, o-dichlorobenzene and benzyl chloride. Usually when the aromatic hydrocarbon is alkyl substituted, the alkyl group contains from one to 14 carbon atoms. Best results are obtained using single ring aromatic compounds such as benzene, toluene and xylene as solvents, especially toluene. The ratio, by volume, of ethylene oxide to solvent used in the process is from about 1:8 to 1:1 and best results are obtained under conditions wherein the ratio of ethylene oxide to solvent is from 1:2 to 1:3.

The hydroformylation reaction is conducted in the presence of any metallic carbonyl hydroformylation catalyst. These catalysts are transition metals, particularly those metals of Group VIII of the Periodic Table, e.g., cobalt, iron, nickel, osmium and complexes such as cobalt carbonyl tertiary phosphine and rhodium carbonyl described, for example, in U.S. Pat. No. 3,161,672. Best results, however, are obtained when a cobalt derivative is used as the catalyst, especially dicobalt octacarbonyl. The amount of hydroformylation catalyst used can vary, but is usually in a weight ratio of 0.3 to 1.5 parts of catalyst to 100 parts of ethylene oxide and, preferably between 0.6 to 0.9 parts.

It has been further found that hydroformylation promoters when used in the present process under the conditions disclosed above result in a substantial increase in conversion of ethylene oxide to trimethylene glycol. Hydroformylation promoters that are used in the process are tertiary butyl alcohol and tertiary amyl alcohol; inorganic halogen-containing compounds, especially those containing chlorine, such as hydrochloric acid and potassium chloride. The amount of hydroformylation promoter used in the process varies widely and depends on the particular substance employed. The addition of small quantities of tertiary alcohol or merely trace amounts of halogen-containing inorganic compounds to the hydroformylation reactants improves the conversion of ethylene oxide to trimethylene glycol from about 40 to 60 percent in most cases. In the case of tertiary alcohols, these promoters are used in admixture with the solvents described above in a ratio of ethylene oxide to tertiary alcohol of from about 1:4 to 10:1 and preferably from about 4:1 to 6:1. Halogen-containing inorganic compounds are employed in trace amounts ranging from about 0.01 to 1 percent by weight based on the amount of ethylene oxide charged and preferably from about 0.1 to 0.5 percent.

The hydroformylation of ethylene oxide in a selected solvent and under the conditions of pressure and temperature disclosed above results in the production of hydroxyethyl hydroxy dioxane. Since this dioxane (dimer) is immiscible in the selected solvent when cooled, it is easily separated therefrom. The solvent phase containing primarily unreacted ethylene oxide and metallic carbonyl catalyst can then be recycled for reuse in the process. The dioxane (dimer) phase if heavier than the solvent phase, which is usually the case, sinks to the bottom of the reaction vessel when cooled, e.g., to about ambient temperature. The hydroxyethyl hydroxy dioxane is separated by any suitable means from the solvent and unreacted ethylene oxide for hydrogenation to trimethylene glycol.

After the hydroxyethyl hydroxy dioxane is separated from the solvent containing ethylene oxide and carbonyl catalyst it is catalytically hydrogenated to trimethylene glycol. The hydrogenation step of the present invention is usually conducted under specified conditions of time and temperature. Generally the hydrogenation temperature is between about 90° and 170° C for about ½ to about 4 hours. The hydrogenation reaction can be carried out with or without solvent. The solvent of choice is water, although nonreactive polar organic solvents, such as dimethoxyethane and the like, can be used. The pH of the hydrogenation mixture is between 2 and 6.9 and preferably between about 5.5 and 6.5. The pressure employed during hydrogenation is usually between about 500 to 2,000 psig and preferably between 900 and 1,100. Quite surprisingly, it has been found that during hydrogenation best results in terms of optimum purity, yield and conversion of ethylene oxide to trimethylene glycol are obtained when the hydrogenation procedure is carried out stepwise. That is, the hydroxyethyl hydroxy dioxane is first heated at about 90° to 120° C for about 1 to 2 hours and then hydrogenation is substantially completed at about 150° to 170° C, usually in about ½ to 1½ hours. The catalyst used in the hydrogenation step can be any of the well known hydrogenation catalysts used in the art such as Raney nickel, palladium, platinum, ruthenium, rhodium, cobalt and the like. It is desirable to employ as the hydrogenation catalyst a metal or a compound of a metal which may be easily and economically prepared, which has a high degree of activity, and retains this activity for extended periods of time. The hydrogenation catalyst may be employed in a finely divided form and dispersed throughout the reaction mixture, or it may be employed on a support or carrier material such as diatomaceous earth, clay, alumina, carbon or the like. The amount of hydrogenation catalyst used can range from 1 to 10 parts per 100 parts of the hydroxyethyl hydroxy dioxane solution to be hydrogenated, but preferably the amount used is between 1 and 3 parts per 100 parts of said dioxane solution. A great deal of processing simplification is obtained by using a cobalt catalyst in the hydrogenation step of the present process when a cobalt carbonyl catalyst is used in the hydroformylation step. The use of dicobalt octacarbonyl during the hydroformylation and a reduced and stabilized cobalt-on-kieselguhr catalyst used for hydrogenation (such as G-61RS, Girdler Catalyst Company) has been found to be particularly effective for the production of trimethylene glycol.

The invention is more thoroughly illustrated with the aid of the following examples. Parts and percentages are by weight unless otherwise indicated.

EXAMPLE 1

A mixture of 100 parts (100 cc) ethylene oxide, 153 parts (175 cc) toluene, 0.3 part of dicobalt octacarbonyl catalyst, and 0.2 part of hydroquinone as stabilizer is prepared in a glass liner maintained under nitrogen at −23° C. The liner and contents are placed in a 1-liter, stainless steel, autoclave precooled with liquid nitrogen and quickly sealed. After purging with $CO/H_2$ (ratio 1.3/1.0), the autoclave is pressured to 4,000 psig with $CO/H_2$ (ratio 1.3/1.0) at a temperature of −15° C. The autoclave is heated to 110° C with good agitation (450 rpm) and maintained at this temperature for 100 minutes at which time hydroformylation of ethylene oxide is complete. The $CO/H_2$ uptake at 110° C is 1,475 psig. The system is cooled to −20° C and slowly vented and purged with nitrogen. The contents of the liner are in two distinct phases. The upper, amber colored layer contains dicobalt octacarbonyl catalyst, toluene and ethylene oxide. The heavier bottom layer is a yellow, viscous oil composed primarily of the hydroformylation product [2-(2-hydroxyethyl)-4-hydroxy-1,3-dioxane] and a small amount of 3-hydroxypropionaldehyde. The yellow oil phase, containing hydroxyethyl hydroxy dioxane, is siphoned off and hydrogenated by dissolving it in water and adding thereto a Raney nickel-chromium catalyst. The pH of the water solution before catalyst addition is 4.4, the pH after the addition of enough (approximately 1 part) Raney nickel-chromium to keep the solution only mildly acidic is 6.4. Hydrogenation to trimethylene glycol is carried out in a stainless steel autoclave at 110° C with good agitation and $H_2$ pressures between 2,225 and 2,400 psig. After cooling and filtering, water is stripped from the crude product at 180 mm pressure. High purity trimethylene glycol (approximately 99 percent) is distilled through a ½ × 6 inch vacuum jacketed distillation column at 6 mm pressure with overhead temperatures between 97°–98 C. The total yield of product is 39.5 parts and the residue after distillation is 0.3 part. This represents an overall conversion of ethylene oxide to trimethylene glycol of 22.9 percent. Based on consumed ethylene oxide, the yield of trimethylene glycol is 91.4 percent.

The infrared (IR) spectrum of 2-(2-hydroxyethyl)-4-hydroxy-1,3-dioxane contains absorption bands attributed to a primary and secondary alcohol as well as a cyclic ether. Upon heating the dimer under controlled conditions, a spectrum of 3-hydroxy propionaldehyde is produced.

The structure is further confirmed by mass spectrometry. No molecular ion was observed. However, this was not surprising since the mass spectra of most aliphatic alcohols do not contain a parent (molecular ion) peak. A weak peak at m/e = 147 (parent - H) is observed, again in accordance with the spectra of aliphatic alcohols. Other peaks and their origins are m/e = 131 (parent - OH), m/e = 130 (parent - $H_2O$), and m/e = 103 (parent - $CH_2$—$C_H2$—OH).

Final confirmation of the molecular structure is made by nuclear magnetic resonance spectroscopy (NMR). The 60 MHz spectrum of:

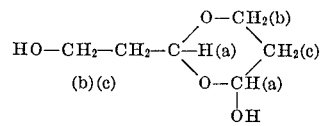

showed that the methine protons, labeled (a), are essentially superimposed triplets with chemical shifts at −306 cps (from tetramethyl silane). The observed coupling constants (J-values) are 6.2 cps. The methylene protons, labeled (b) are also nearly superimposed triplets resonating at −220 cps with observed J-values of 6.2 cps, while the methylene protons, labeled (c), are superimposed quartets resonating at −110 cps with observed coupling constants of 6.2 cps.

The hydroxyl protons are exchanging with the small amount of water in the $D_2O$ solvent to give a broad singlet at −275 cps. The shift of this peak is strongly dependent upon temperature and concentration because of exchange and hydrogen bonding effects.

The intensity ratio of the different protons from high to low field is 2/2/1/1.

EXAMPLE 2

A mixture of 186.2 parts (260 cc) isopropyl ether, 197.8 parts (200 cc) ethylene oxide, along with 0.1 part hydroquinone is charged under a nitrogen purge to a precooled 1 liter, stainless steel, autoclave equipped with a bottom drop. After tightening down the autoclave head, a solution of 0.6 part of dicobalt octacarbonyl dissolved in 30 cc of isopropyl ether is added under a nitrogen purge through a small port to the stirring autoclave charge. The system is purged with $CO/H_2$ (ratio 1.3/1.0) and pressured with this gas mixture to 4,200 psig. The autoclave is then heated at 110° C for 70 minutes at 1,000 rpm. The hydroformylation mixture is then cooled to room temperature and agitation stopped. The $CO/H_2$ uptake during this period at 110° C amounted to 1,800 psig. With the system at room temperature and a pressure of 3,200 psig, a viscous, oily, 2-(2-hydroxyethyl)-4-hydroxy-1,3-dioxane layer is withdrawn and dissolved in 200 cc of cold distilled water. Analysis indicates that the water solution contains 2-(2-hydroxyethyl)-4-hydroxy-1,3-dioxane as the primary product along with smaller amounts of ethylene oxide and hydroxypropionaldehyde. The autoclave is repressured with $CO/H_2$ (ratio 1.3/1.0) to 4,200 psig and reheated at 110° C for 90 minutes at 1000 rpm. The $CO/H_2$ uptake during this period of operation is 1,600 psig. The system is again cooled to room temperature and agitation discontinued. 2-(2-Hydroxyethyl)-4-hydroxy-1,3-dioxane is withdrawn from the bottom drop and dissolved in cold distilled water. The aqueous solutions from both cycles are combined after removal of residual ethylene oxide by vacuum stripping. The solution has a pH of 4.9 which is adjusted to a pH of 6.1 by the addition of a small amount of Raney nickel-chromium (approximately 2 parts). The solution is hydrogenated in a stainless steel autoclave for 90 minutes at 105° C using good agitation at hydrogen pressures between 825 and 1,015 psig. After cooling and filtering, water is stripped from the crude product at 50 mm pressure. Trimethylene glycol is flash distilled through a ½ × 6 inch vacuum jacketed column at 3 mm pressure to produce 75 parts of product (approximately 99 percent pure by gas chromatography) and 23 parts of residue.

EXAMPLE 3

88 Parts of ethylene oxide, 0.88 parts of freshly prepared dicobalt octacarbonyl, and 346 parts (400 cc) of toluene, and 80 microliters of HCl are reacted in a hydroformylation reaction at 120° C under 4000 to 5,200 psig $CO/H_2$ pressure for 129 minutes. After cooling the reaction products to about 30° C, the oily phase containing 2-(2-hydroxyethyl)-4-hydroxy-1,3-dioxane is separated by decantation from the solvent phase containing toluene, ethylene oxide and cobalt catalyst. The dioxane is added to 100 cc of water and hydrogenated to trimethylene glycol over a Raney nickel hydrogenation catalyst at 105° C and at hydrogen pressures between 600 to 1,200 psig. Distillation of the hydrogenated product gives 94.1 parts of trimethylene glycol, which corresponds to a 61.8 percent conversion and 77.8 percent yield. A residue of 17.6 parts remained.

EXAMPLE 4

Following the procedure described in Example 3, 110 parts of ethylene oxide solvated with 238 parts (275 cc) toluene are hydroformylated in the presence of 0.80 part dicobalt octacarbonyl and 25 ml of tertiary butyl alcohol as hydroformylation promoter to 2-(2-hydroxyethyl)-4-hydroxy-1,3-dioxane. The mixture was cooled to ambient temperature, the dioxane separated therefrom and dissolved in 400 cc of water to which a catalytic amount of Raney nickel (2 parts) is added, thus adjusting the pH to 2.55. Hydrogenation is carried out in a Hastelloy C autoclave. The system is pressured to 1,100 psig of hydrogen at 25° C and is heated to 105° C. Pressures between 850 psig and 1,075 psig are maintained for 110 minutes at this temperature. The temperature is then raised to 160° C at pressures between 775 and 850 psig for 60 minutes. After cooling, venting and filtering, the water is removed by stripping. Using vacuum distillation at 1 mm pressure through a ½ × 6 inch column, 111.7 parts of trimethylene glycol of 99.9 percent purity is obtained. The nonvolatile distillation residue amounts to 6.8 parts. This amount of product corresponds to 58.8 percent conversion of ethylene oxide to trimethylene glycol.

EXAMPLE 5

The procedure described in Example 3 is repeated except that 0.07 parts of potassium chloride is substituted for the hydrochloric acid, and 26.8 parts of ethylene oxide, 0.2 part of dicobalt octacarbonyl and 66 parts of toluene are charged for hydroformylation. After hydrogenation, a 50.1 percent conversion of ethylene oxide to trimethylene glycol is obtained.

EXAMPLE 6

34.5 Parts of ethylene oxide are hydroformylated in a mixture consisting of 65 parts toluene, 22.5 parts bromobenzene, 0.2 part dicobalt octacarbonyl at 120° C with $CO/H_2$ (1/1) at pressures of 4,000–5,000 psig for 227 minutes to produce 2-(2-hydroxyethyl)-4-hydroxy-1,3-dioxane. After cooling the reaction products to 20° C two phases form. The oily phase containing 2-(2-hydroxyethyl)-4-hydroxy-1,3-dioxane is separated from the solvent phase by decantation and dissolved in water. The aqueous dioxane is then hydrogenated with Raney nickel catalyst for approximately 90 minutes at 105° C with pressures averaging 900 psig to obtain trimethylene glycol. After cooling, filtration, and vacuum distillation, 28.1 parts of trimethylene glycol are isolated. This corresponds to a 47.1 percent conversion of ethylene oxide to trimethylene glycol.

EXAMPLE 7

Following the procedure described in Example 1, 27.9 parts of ethylene oxide and 0.2 part of dicobalt octacarbonyl are mixed with 82.5 parts of chlorobenzene at 120° C and at 4,000 to 5,000 psig pressure ($CO/H_2$ ratio 1/1) for about 143 minutes. The reaction mixture was cooled to about 0° C and the solvent phase containing chlorobenzene, ethylene oxide and cobalt catalyst was separated by siphoning from 2-(2-hydroxyethyl)-4-hydroxy-1,3-dioxane. The dioxane was hydrogenated at 105° C for about two hours and about 19.1 parts of trimethylene glycol was recovered thus representing a 40.4 percent conversion of ethylene oxide to trimethylene glycol.

EXAMPLE 8

28 Parts of ethylene oxide are hydroformylated in a mixture consisting of 65 parts toluene, 19.4 parts o-dichlorobenzene and 0.2 part dicobalt octacarbonyl at 120° C with $CO/H_2$ (1/1) at pressures of 4,000-5,000 psig for 213 minutes to produce 2-(2-hydroxyethyl)-4-hydroxy-1,3-dioxane. After cooling the reaction products to about 15° C two phases form. The oily phase containing primarily 2-(2-hydroxyethyl)-4-hydroxy-1,3-dioxane is separated from the solvent phase by decantation and dissolved in water. The aqueous dioxane is then hydrogenated with Raney nickel catalyst for approximately 90 minutes at 105° C and hydrogen pressures averaging about 900 psig to obtain trimethylene glycol. After cooling, filtration, and vacuum distillation, 23.9 parts of trimethylene glycol are obtained. This corresponds to a 49.4 percent conversion of ethylene oxide to trimethylene glycol.

EXAMPLE 9

65 Parts of ethylene oxide, 0.80 part of dicobalt octacarbonyl, 346.4 parts toluene and 11.7 parts of tertiary butyl alcohol are hydroformylated for approximately 150 minutes at 120° C pressured with 3,200–3,600 psig of $CO/H_2$ in a ratio of 1/1. The resulting 2-(2-hydroxyethyl)-4-hydroxy-1,3-dioxane is cooled to about 20° C, separated from the solvent and unreacted components and dissolved in 300 parts of water. A catalytic amount of cobalt on kieselguhr catalyst (3 parts Girdler Co. G–61RS) is added to said dioxane and hydrogenation is carried out in two stages at about 900 psig of hydrogen. The first stage involves heating for 2 hours at 115° C with agitation. The second stage involves heating for 1 hour at 160° C. Upon cooling, venting, filtration and water stripping, 56.30 parts of high purity trimethylene glycol (99.9 percent) are obtained after vacuum distilling through a ½ × 6 inch column at 1 mm pressure.

We claim:

1. A process which comprises hydroformylating ethylene oxide with carbon monoxide and hydrogen under pressures between about 1,000 to 15,000 psig in the presence of a metallic carbonyl catalyst containing a metal from Group VIII and at least one solvent selected from the group consisting of aliphatic ethers having four to 16 carbon atoms, halogenated aromatic and aromatic hydrocarbons having six to 24 carbon atoms wherein the ratio by volume of ethylene oxide to solvent is within a range of from about 1:8 to 1:1 at temperatures of from about 100° to 130° C. to produce hydroxyethyl hydroxy dioxane.

2. A process of claim 1 wherein the solvent is toluene.

3. A process of claim 1 wherein the solvent is isopropyl ether.

4. A process of claim 1 wherein the solvent is chlorobenzene.

5. A process of claim 1 wherein the carbonyl catalyst contains cobalt.

6. A process of claim 5 wherein the carbonyl catalyst is dicobalt octacarbonyl.

7. A process of claim 1 wherein hydroformylation is conducted in the presence of a hydroformylation promoter selected from the group consisting of tertiary butyl alcohol, tertiary amyl alcohol, hydrochloric acid and potassium chloride.

8. A process of claim 1 wherein hydroformylation is conducted in the presence of the hydroformylation promoter tertiary butyl alcohol.

9. A process of claim 1 wherein hydroformylation is conducted in the presence of the hydroformylation promoter hydrochloric acid.

10. A process of claim 6 wherein pressure during hydroformylation is between about 3,000 to 6,000 psig, the solvent is toluene, and the ratio of ethylene oxide to solvent is between 1:2 and 1:3.

11. A process of claim 1 wherein the ratio of ethylene oxide to solvent is from 1:2 to 1:3.

12. A process of claim 1 wherein the temperature during hydroformylation is not more than 120° C.

13. A process of claim 12 wherein the pressure during hydroformylation is between 3,000 to 6,000 psig.

14. A process of claim 13 including the additional step of hydrogenating hydroxyethyl hydroxy dioxane by first heating it to 90° to 120° C. for about one to two hours and then further hydrogenating at about 150° to 170° C. to completion.

15. A process for making trimethylene glycol which comprises hydroformylating ethylene oxide with carbon monoxide and hydrogen under pressures between about 1,000–15,000 psig in the presence of a metallic carbonyl catalyst containing a metal from Group VIII and at least one solvent selected from the group consisting of aliphatic ethers having four to 16 carbon atoms, halogenated aromatic and aromatic hydrocarbons having six to 24 carbon atoms wherein the ratio by volume of ethylene oxide to solvent is within a range of from about 1:8 to 1:1 at temperatures of from about 100° to 130° C. to produce a mixture containing hydroxyethyl hydroxy dioxane, cooling said mixture to below about 35° C., removing said dioxane therefrom and catalytically hydrogenating said dioxane to trimethylene glycol.

16. A process of claim 15 wherein cobalt is added as hydrogenation catalyst.

17. A process of claim 15 wherein nickel is added as hydrogenation catalyst.

18. A process of claim 15 wherein hydrogenation is conducted at a pH between about 2 to 6.9.

19. A process of claim 15 wherein hydrogenation is conducted at a pH of between 5.5 and 6.5.

20. A process of claim 15 wherein hydrogenation is carried out stepwise by first heating hydroxyethyl hydroxy dioxane at about 90° to 120° C for about one to two hours and then further hydrogenating at about 150° to 170° C until substantially complete.

\* \* \* \* \*